(12) United States Patent
Goto et al.

(10) Patent No.: US 7,760,731 B2
(45) Date of Patent: Jul. 20, 2010

(54) HOST UNIT IN A PASSIVE OPTICAL NETWORK

(75) Inventors: Michihiko Goto, Yokohama (JP);
Masamichi Kasa, Yokohama (JP);
Masahiko Iwakiri, Yokohama (JP);
Kazuhiro Uchida, Yokohama (JP);
Manabu Tomiyasu, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 972 days.

(21) Appl. No.: 10/960,881

(22) Filed: Oct. 7, 2004

(65) Prior Publication Data

US 2005/0195819 A1    Sep. 8, 2005

(30) Foreign Application Priority Data

Mar. 2, 2004    (JP) ............... 2004-057351

(51) Int. Cl.
*H04L 12/56* (2006.01)
*H04L 12/28* (2006.01)
(52) U.S. Cl. ...................... 370/392; 370/401
(58) Field of Classification Search ............... None
See application file for complete search history.

(56) References Cited

U.S. PATENT DOCUMENTS

| | | | |
|---|---|---|---|
| 6,490,292 B1 * | 12/2002 | Matsuzawa | 370/401 |
| 7,123,620 B1 * | 10/2006 | Ma | 370/395.32 |
| 7,167,474 B2 * | 1/2007 | Sugai et al. | 370/392 |
| 7,245,621 B2 * | 7/2007 | Sala et al. | 370/392 |
| 7,272,137 B2 * | 9/2007 | Unitt et al. | 370/389 |
| 2004/0109450 A1 * | 6/2004 | Kang et al. | 370/390 |
| 2004/0120326 A1 * | 6/2004 | Yoon et al. | 370/395.53 |
| 2005/0002390 A1 * | 1/2005 | Kim et al. | 370/389 |

FOREIGN PATENT DOCUMENTS

| | | |
|---|---|---|
| JP | 2001-197097 A | 7/2001 |
| JP | 2002-271382 | 9/2002 |
| JP | 2002-271382 A | 9/2002 |
| JP | 2003-143174 | 5/2003 |
| JP | 2003-143174 A | 5/2003 |

OTHER PUBLICATIONS

Japanese Office Action issued in corresponding JP 2004-057351, mailing date—Apr. 14, 2009—partial English-language translation.
Hironori Terauchi, et al., "VLAN Control in Ethernet PON System", Technical Report of IEICE CS2002-108 to 114, Nov. 11, 2004, pp. 13-17, Partial.

\* cited by examiner

*Primary Examiner*—Pankaj Kumar
*Assistant Examiner*—Marcus R Smith
(74) *Attorney, Agent, or Firm*—Fujitsu Patent Center

(57) ABSTRACT

A communication device capable of restraining the packet transmission efficiency from lowering. An address storing unit extracts, from uplink packets, the addresses of terminals connected to sub-units and registers the addresses in an address management table. An address extracting unit extracts the address of a destination terminal included in a downlink packet output from a layer 2 switch, and an address determining unit determines whether or not the address of the destination terminal is registered in the address management table. In accordance with the result of the determination, a packet output unit outputs the downlink packet to a corresponding coupler.

14 Claims, 19 Drawing Sheets

12ab MAC MANAGEMENT TABLE

| Sub-unit Name | MAC Address |
|---|---|
| Sub-unit #1 | XXXX |
| | YYYY |
| | ⋮ |
| | ZZZZ |
| ⋮ | ⋮ |
| Sub-unit #I | AAAA |
| | BBBB |
| | ⋮ |
| | CCCC |

FIG. 5

31ab IP MANAGEMENT TABLE

| Sub-unit Name | IP Address |
|---|---|
| Sub-unit #1 | zzzz |
| | yyyy |
| | ⋮ |
| | xxxx |
| ⋮ | ⋮ |
| Sub-unit #1 | cccc |
| | bbbb |
| | ⋮ |
| | aaaa |

FIG. 9

41ab MANAGEMENT TABLE

| Sub-unit Name | Sub-unit Registration Information |
|---|---|
| Sub-unit #1 | Registered |
| Sub-unit #2 | Not registered |
| Sub-unit #3 | Registered |
| Sub-unit #4 | Not registered |
| ⋮ | ⋮ |
| Sub-unit #I | Not registered |

FIG. 11

51ab MANAGEMENT TABLE

| Sub-unit Name | Sub-unit State Information |
|---|---|
| Sub-unit #1 | Normal |
| Sub-unit #2 | Normal |
| Sub-unit #3 | Anomalous |
| Sub-unit #4 | Normal |
| ⋮ | ⋮ |
| Sub-unit #l | Normal |

FIG. 13

61ab MANAGEMENT TABLE

| Sub-unit Name | Link Information |
|---|---|
| Sub-unit #1 | Link established |
| Sub-unit #2 | Link not established |
| Sub-unit #3 | Link established |
| Sub-unit #4 | Link not established |
| ⋮ | ⋮ |
| Sub-unit #I | Link not established |

FIG. 16

71ab MANAGEMENT TABLE

| Sub-unit Name | Line Speed | Flow Rate |
|---|---|---|
| Sub-unit #1 | 10M | 8M |
| Sub-unit #2 | 100M | 20M |
| Sub-unit #3 | 100M | 15M |
| Sub-unit #4 | 10M | 10M |
| ⋮ | ⋮ | ⋮ |
| Sub-unit #l | 10M | 3M |

FIG. 18

HOST UNIT IN A PASSIVE OPTICAL NETWORK

CROSS-REFERENCE TO RELATED APPLICATIONS

This application is based upon and claims priority of Japanese Patent Application No. 2004-057351, filed on Mar. 2, 2004, the contents being incorporated herein by reference.

BACKGROUND OF THE INVENTION (1) Field of the Invention

The present invention relates to a communication device, and more particularly, to a communication device connected with a plurality of couplers on a downlink side thereof, each coupler being connected with a plurality of sub-units.

(2) Description of the Related Art

Currently, with the advent of a real broadband age, FTTH (Fiber to The Home) is being constructed as most prospective means for high-speed access because of its large-capacity/wideband transmission and the capability to provide services of uniform and stable quality.

For such FTTH applications, PON (Passive Optical Network) which comprises a host unit arranged on a central office side and a sub-unit arranged on a subscriber side and connected with a plurality of user terminals is considered an effective network configuration because, with PON, the cost of laying optical fibers can be reduced and also the accommodation efficiency of the central office side can be increased. Also, since the branch point requires neither power supply nor maintenance, PON provides high flexibility in configuring networks.

In the PON architecture, the host unit takes charge of the management of sub-units, such as registration/deletion of sub-units, and each sub-unit notifies the host unit of alarm, link state, link speed, etc. FIG. 19 illustrates a PON system configuration. As shown in FIG. 19, a host unit 101 is connected with couplers 102a, 102m. To the couplers 102a, ..., 102m are connected a plurality of sub-units 103a, ..., 103n which in turn are connected with terminals 104a, ..., 104x. The host unit 101 includes a layer 2 switch 101a for switching a packet path at layer 2 which is the data-link layer in the OSI reference model, buffering sections 101ba, ..., 101bm, and PON interfaces 101ca, ..., 101cm.

Transmission (uplink transmission) of packets from the sub-units 103a, ..., 103n (terminals 104a, ..., 104x) to the host unit 101 is started after the sub-units 103a, ..., 103n are registered and transmission timings and bandwidths therefor are designated by the host unit 101.

When transmitting packets from the host unit 101 to the sub-units 103a, ..., 103n (downlink transmission), first, the layer 2 switch 101a carries out switching of packets to be output to the PON interfaces 101ca, ..., 101cm connected with the sub-units (couplers). The PON interfaces 101ca, ..., 101cm then transmit the packets output from the layer 2 switch 101a to the respective sub-units 103a, ..., 103n associated therewith. When the layer 2 switch 101a is input with packets with unknown destinations, such packets are output to all PON interfaces 101ca, ..., 101cm and then to all couplers 102a, ..., 102m.

As regards a star network configuration in which a plurality of branch offices (BO's) are connected in star form to a head office (HO) via an ATM (Asynchronous Transfer Mode) network, a star network connection system has been proposed which permits efficient use of the bandwidth of the ATM network in cases where MAC (Media Access Control) frames to be transmitted are broadcast frames or destination MAC address are unlearned addresses (e.g., Unexamined Japanese Patent Publication No. 2003-143174. There has also been proposed an access router for preventing congestion from occurring in a layer 2 section and thereby preventing packets with high priority from being discarded (e.g., Unexamined Japanese Patent Publication No. 2002-271382.

In cases where packets with unknown destinations are input to the layer 2 switch, however, such packets are broadcast and delivered to all sub-units, as mentioned above. Accordingly, although there are actually no terminals that are to receive packets with unknown destinations, the packets are delivered to all sub-units connected to the PON interfaces, wasting the transmission bandwidth and lowering the transmission efficiency.

SUMMARY OF THE INVENTION

The present invention was created in view of the above circumstances, and an object thereof is to provide a communication device capable of preventing packets with unknown destinations, among packets being delivered to terminals, from being output to sub-units and thereby restraining transmission efficiency from lowering.

To achieve the object, there is provided a communication device connected with a plurality of couplers on a downlink side thereof, each of the couplers being connected with a plurality of sub-units. The communication device comprises a layer 2 switch for switching a path for outputting packets to the couplers, at layer 2 in an OSI reference model, address storing means for extracting, from uplink packets, addresses of terminals connected to the sub-units, and for storing the extracted addresses in an address management table, address extracting means for extracting an address of a destination terminal included in a downlink packet output from the layer 2 switch, address determining means for determining whether or not an address identical with the address extracted by the address extracting means is stored in the address management table, and packet output means for outputting the downlink packet to a corresponding one of the couplers in accordance with a result of the determination by the address determining means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram showing an exemplary data structure of a MAC management table;

FIG. 9 is a diagram showing an exemplary data structure of an IP management table;

FIG. 11 is a diagram showing an exemplary data structure of a management table;

FIG. 13 is a diagram showing an exemplary data structure of a management table;

FIG. 16 is a diagram showing an exemplary data structure of a management table;

FIG. 18 is a diagram showing an exemplary data structure of a management table.

DESCRIPTION OF THE PREFERRED EMBODIMENTS

The principles of the present invention will be described first with reference to the drawings.

Figure 1:
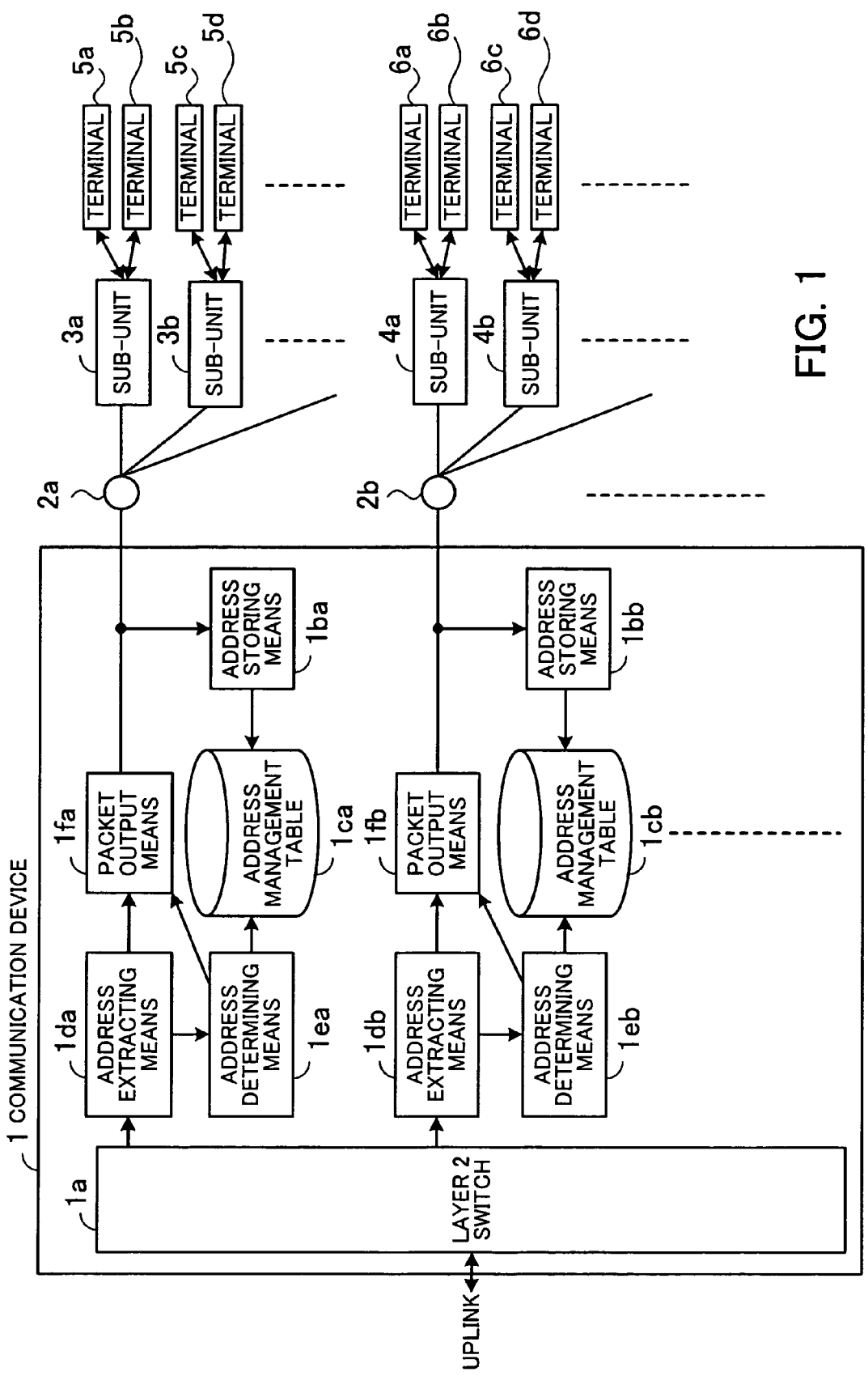
FIG. 1 is a diagram illustrating the principles of the present invention.

FIG. 1 illustrates the principles of the present invention.

As shown in FIG. 1, a communication device 1 is connected with couplers 2a, 2b, . . . . The couplers 2a, 2b, . . . are each connected with a plurality of sub-units 3a, 3b, . . . , 4a, 4b, . . . , and the sub-units 3a, 3b, . . . , 4a, 4b, . . . are each connected with terminals 5a to 5d, . . . , 6a to 6d, . . . .

The communication device 1 receives packets from an uplink and switches a path for outputting the received packets to the couplers 2a, 2b, . . . , at layer 2 in the OSI reference model. The couplers 2a, 2b, . . . optically split the packets and output the packets to the sub-units 3a, 3b, . . . , 4a, 4b, . . . and then to the terminals 5a to 5d, . . . , 6a to 6d, . . . . The terminals 5a to 5d, . . . , 6a to 6d, . . . individually receive packets destined therefor.

Packets transmitted from the terminals 5a to 5d, . . . , 6a to 6d, . . . are passed on through the sub-units 3a, 3b, . . . , 4a, 4b, . . . and the couplers 2a, 2b, . . . and are received by the communication device 1. The communication device 1 outputs the received packets to the uplink.

The communication device 1 includes a layer 2 switch 1a, address storing means 1ba, 1bb, . . . , address management tables 1ca, 1cb, . . . , address extracting means 1da, 1db, . . . , address determining means 1ea, 1eb, . . . , and packet output means 1fa, 1fb, . . . .

The layer 2 switch 1a switches a path for outputting packets to the couplers 2a, 2b, . . . , at layer 2 in the OSI reference model.

The address storing means 1ba, 1bb, . . . extract, from uplink packets, addresses of the terminals 5a to 5d, . . . , 6a to 6d, . . . connected to the sub-units 3a, 3b, . . . , 4a, 4b, . . . , and store the extracted addresses in the respective address management tables 1ca, 1cb, . . . .

The address extracting means 1da, 1db, . . . extract addresses of destination terminals, included in downlink packets output from the layer 2 switch 1a.

The address determining means 1ea, 1eb, . . . determine whether or not addresses identical with those extracted by the respective address extracting means 1da, 1db, . . . are stored in the address management tables 1ca, 1cb, . . . associated therewith.

The packet output means 1fa, 1fb, . . . output the downlink packets to the respective couplers 2a, 2b, . . . in accordance with the results of determination by the respective address determining means 1ea, 1eb, . . . . Specifically, when it is judged by the address determining means 1ea, 1eb, . . . that the addresses extracted by the address extracting means 1da, 1db, . . . are stored in the respective address management tables 1ca, 1cb, . . . , the packet output means 1fa, 1fb, . . . output the downlink packets to the respective couplers 2a, 2b, . . . .

Thus, the addresses of the terminals 5a to 5d, . . . , 6a to 6d, . . . connected to the sub-units 3a, 3b, . . . , 4a, 4b, . . . are extracted from uplink packets and are stored in the address management tables 1ca, 1cb, . . . . It is then determined whether or not the addresses of destination terminals included in downlink packets are stored in the address management tables 1ca, 1cb, . . . , and in accordance with the determination results, the downlink packets are output to the couplers 2a, 2b, . . . .

Namely, if the addresses of destination terminals included in downlink packets are not stored in the address management tables 1ca, 1cb, . . . , then it can be judged that the destination terminals are not connected to the sub-units 3a, 3b, . . . , 4a, 4b, . . . , and accordingly, the output of such packets with unknown destinations to the sub-units 3a, 3b, . . . , 4a, 4b, . . . is suspended. This prevents packets with unknown destinations from being output to the sub-units, making it possible to restrain lowering of the transmission efficiency for valid packets.

In the following, host units as communication devices according to embodiments of the present invention will be described in detail with reference to the drawings.

Figure 2:
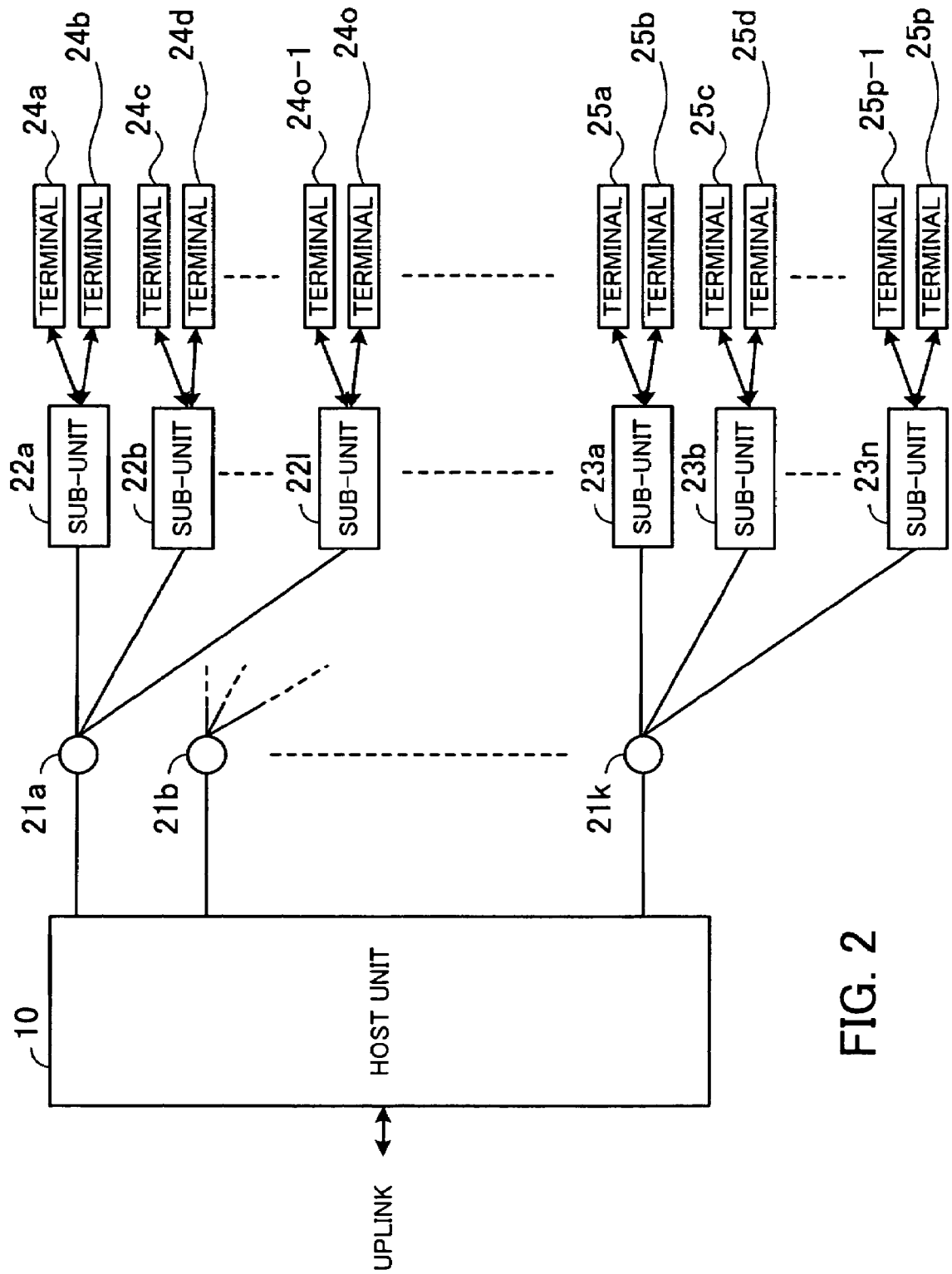
FIG. 2 is a diagram showing an exemplary system configuration including a host unit according to a first embodiment.

FIG. 2 shows an exemplary system configuration including a host unit according to a first embodiment.

As shown in FIG. 2, the host unit 10 is connected, on a downlink side thereof, with light-splitting couplers 21a, 21b, . . . , 21k through optical cables. The coupler 21a is connected with sub-units 22a, 22b, . . . , 22l through respective optical cables. Similarly, the couplers 21b, . . . are each connected with a plurality of sub-units, and the coupler 21k is connected with sub-units 23a, 23b, . . . , 23n.

The sub-unit 22a is connected with terminals 24a and 24b, and the sub-unit 22b is connected with terminals 24c and 24d. Similarly, each sub-unit connected to the coupler 21a is connected with terminals, and the sub-unit 22l is connected with terminals 24o-1 and 24o. Also, the sub-units connected to the couplers 21b, . . . are each connected with terminals. The sub-unit 23a connected to the coupler 21k is connected with terminals 25a and 25b, and the sub-unit 23b is connected with terminals 25c and 25d. Similarly, each sub-unit connected to the coupler 21k is connected with terminals, and the sub-unit 23n is connected with terminals 25p-1 and 25p. Although in FIG. 2 each sub-unit is connected with two terminals, three or more terminals may of course be connected to each sub-unit.

When supplied with packets from an uplink, the host unit 10 distributes the packets to the couplers 21a, 21b, . . . , 21k in accordance with destinations included in the packets. The packets thus distributed to the couplers 21a, 21b, . . . , 21k are input to the respective sub-units 22a, 22b, . . . , 22l, . . . , 23a, 23b, . . . , 23n, which then output the packets to the respective terminals 24a, 24b, . . . , 24o, . . . , 25a, 25b, . . . , 25p. The individual terminals receive packets destined therefor.

Also, the host unit 10 receives packets transmitted thereto from the terminals 24a, 24b, . . . , 24o, . . . , 25a, 25b, . . . , 25p through the sub-units 22a, 22b, . . . , 22l, . . . , 23a, 23b, . . . , 23n and the couplers 21a, 21b, . . . , 21k, and outputs the received packets to the uplink. Specifically, the host unit 10 sequentially accesses the sub-units 22a, 22b, . . . , 22l, . . . , 23a, 23b, . . . , 23n by a time-division multiplexing technique to receive packets transmitted from the terminals 24a, 24b, ..., 24o, ..., 25a, 25b, ..., 25p, and outputs the received packets to the uplink.

The host unit 10 is connected to other host units by optical cables for communication therewith. Thus, the terminals 24a, 24b, ..., 24o, ..., 25a, 25b, ..., 25p under the control of the host unit 10 can communicate with other terminals under the control of the other host units.

Further, the host unit 10 filters out unnecessary packets from among downlink packets to be output to the couplers 21a, 21b, ..., 21k. Namely, the host unit 10 prevents the transmission bandwidth from being occupied by unnecessary packets, to thereby improve the transmission efficiency for valid packets.

The host unit 10 will be now described in more detail.

Figure 3:
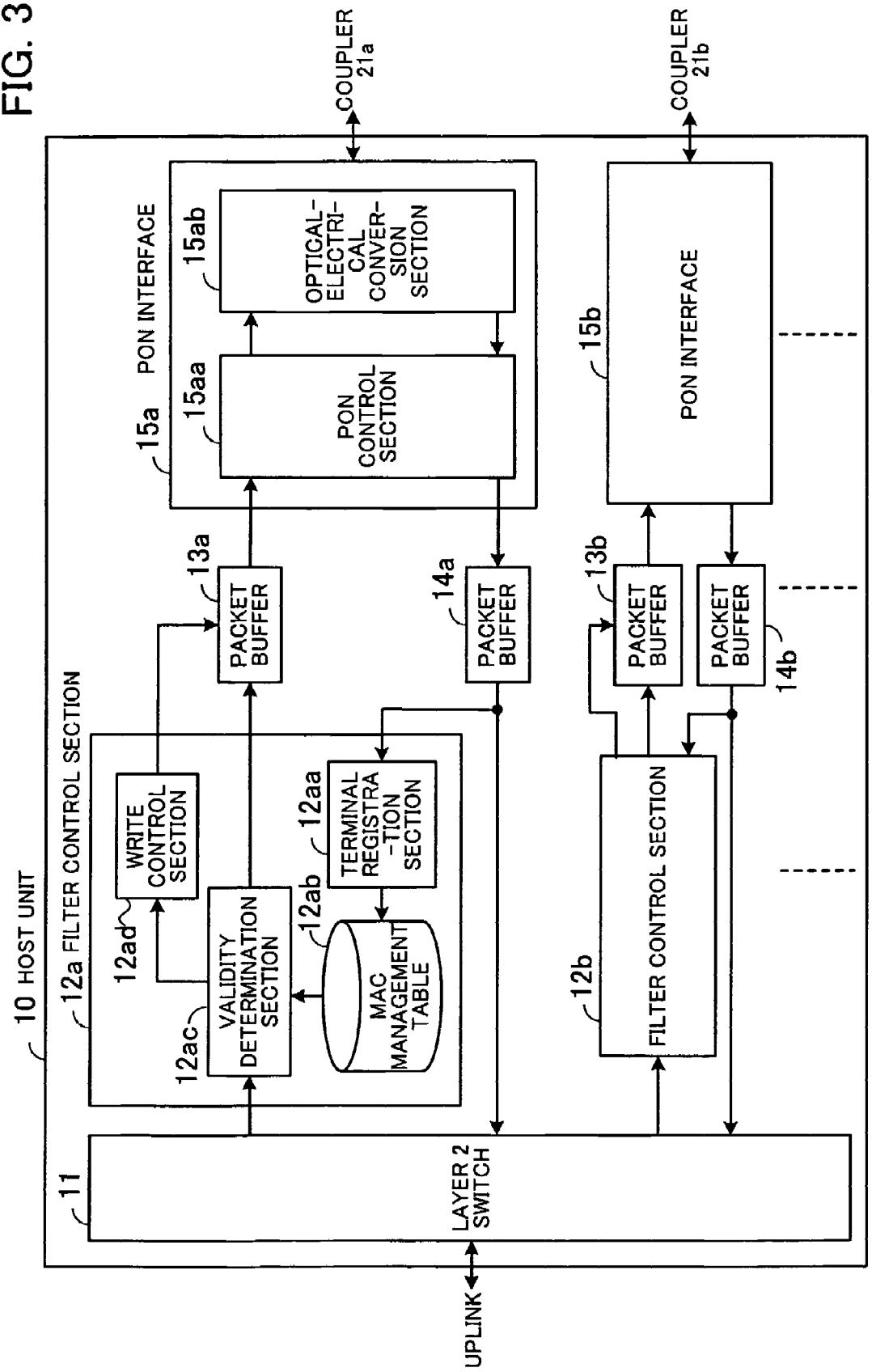
FIG. 3 is a circuit block diagram of the host unit according to the first embodiment.

FIG. 3 is a circuit block diagram of the host unit according to the first embodiment.

As shown in FIG. 3, the host unit 10 includes a layer 2 switch 11, filter control sections 12a, 12b, ..., packet buffers 13a, 13b, ..., 14a, 14b, ..., and PON interfaces 15a, 15b, ....

The filter control section 12a, the packet buffers 13a and 14a and the PON interface 15a are associated with the coupler 21a shown in FIG. 2 and transmit/receive packets to/from the sub-units 22a, 22b, ..., 22l connected to the coupler 21a. The filter control section 12b, the packet buffers 13b and 14b and the PON interface 15b are associated with the coupler 21b and transmit/receive packets to/from the sub-units connected to the coupler 21b. Similarly, each of the other filter control sections and its corresponding two packet buffers and PON interface are associated with a plurality of sub-units and transmit/receive packets to/from the sub-units.

The filter control sections 12a, 12b, ... have an identical construction. Also, the packet buffers 13a, 13b, ..., 14a, 14b, ... have an identical construction, and the PON interfaces 15a, 15b, ... have an identical construction. Accordingly, in the following, the constructions and functions of only the layer 2 switch 11, filter control section 12a, packet buffers 13a and 14a, and PON interface 15a will be explained.

The layer 2 switch 11 performs switching of packets supplied from the uplink, at layer 2 in the OSI reference model. Specifically, the layer 2 switch 11 distributes packets to the filter control sections 12a, 12b, ... at layer 2 level of the packets. The distributed packets are output to the couplers 21a, 21b, ... through the filter control sections 12a, 12b, ..., the packet buffers 13a, 13b, ... and the PON interfaces 15a, 15b, ... and delivered to designated sub-units and terminals. Also, the layer 2 switch 11 receives packets transmitted thereto from the individual terminals through the PON interfaces 15a, 15b, ... and the packet buffers 14a, 14b, ..., and outputs the received packets to the uplink.

The filter control section 12a includes a terminal registration section 12aa, a MAC management table 12ab, a validity determination section 12ac, and a write control section 12ad.

The terminal registration section 12aa extracts MAC addresses of terminals connected to the sub-units, from uplink packets output from the packet buffer 14a, and stores the extracted addresses in the MAC management table 12ab. At this time, the terminal registration section 12aa stores the extracted MAC addresses of the terminals in the MAC management table 12ab while grouping the addresses by sub-unit.

The MAC management table 12ab is, for example, a table configured in a storage device such as a hard disk drive or RAM. A MAC frame format and an exemplary structure of the MAC management table 12ab will be described with reference to the drawings.

Figure 4:
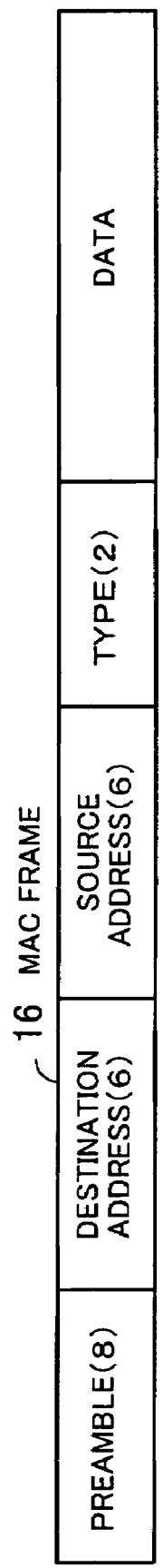
FIG. 4 is a diagram showing a MAC frame format.

FIG. 4 shows the MAC frame format.

As shown in FIG. 4, a MAC frame 16 consists of PREAMBLE, DESTINATION ADDRESS, SOURCE ADDRESS, TYPE, and DATA. The parenthesized numerals appearing in FIG. 4 represent the respective numbers of bytes allocated to PREAMBLE, DESTINATION ADDRESS, SOURCE ADDRESS, and TYPE.

In SOURCE ADDRESS is stored the MAC address of a terminal which is the source of the packet, and in DESTINATION ADDRESS is stored the MAC address of a terminal which is the destination of the packet.

FIG. 5 exemplifies the data structure of the MAC management table.

As shown in FIG. 5, the MAC management table 12ab has columns labeled "Sub-unit Name" and "MAC Address". The sub-units are assigned respective identifiers whereby the individual sub-units can be identified. In the column "Sub-unit Name" are stored the identifiers of the sub-units connected to the host unit 10, and in the column "MAC Address" are stored the MAC addresses of the terminals connected to the respective sub-units.

In the example of FIG. 5, the identifiers of the sub-units connected to the host unit 10 are "Sub-unit #1", ..., "Sub-unit #1". The MAC addresses of the terminals connected to the sub-unit "Sub-unit #1" are "XXXX", "YYYY", ..., "ZZZZ", and the MAC addresses of the terminals connected to the sub-unit "Sub-unit #1" are "AAAA", "BBBB", ..., "CCCC".

Each uplink packet output from the packet buffer 14a includes the MAC address of a terminal which is the source of the packet, as explained above with reference to FIG. 4. The MAC address is extracted by the terminal registration section 12aa, grouped by sub-unit, and stored in the MAC management table 12ab, as explained above with reference to FIG. 5. Consequently, the MAC addresses of the terminals connected to the sub-units are stored in the MAC management table 12ab.

The validity determination section 12ac receives downlink packets output from the layer 2 switch 11 and outputs the packets to the packet buffer 13a. Also, on receiving a packet from the layer 2 switch 11, the validity determination section 12ac extracts, from the packet, the MAC address (destination address) of a terminal for which the packet is destined, and determines whether or not the extracted MAC address is registered (stored) in the MAC management table 12ab. If the MAC address is registered in the MAC management table 12ab, the validity determination section 12ac outputs validity information indicating validity of the packet output from the layer 2 switch 11, to the write control section 12ad. If the MAC address is not registered in the MAC management table 12ab, the validity determination section 12ac outputs invalidity information indicating invalidity of the packet output from the layer 2 switch 11, to the write control section 12ad.

In accordance with the validity information and invalidity information supplied from the validity determination section 12ac, the write control section 12ad controls the writing of packets output from the validity determination section 12ac into the packet buffer 13a. Specifically, if validity information is output from the validity determination section 12ac, the write control section 12ad outputs a write instruction to the packet buffer 13a, and if invalidity information is output from the validity determination section 12ac, the write control section 12ad does not output a write instruction to the packet buffer 13a.

When a packet write instruction is received from the write control section 12ad, the packet buffer 13a retains the packet output from the validity determination section 12ac and outputs the packet to the PON interface 15a. When no packet write instruction is received from the write control section 12*ad*, the packet output from the validity determination section 12*ac* is neither retained nor output to the PON interface 15*a*.

Namely, if the MAC address (destination address) of a packet output from the layer 2 switch 11 is registered in the MAC management table 12*ab*, it means that the terminal to which the packet is to be transmitted is connected to any of the sub-units. Accordingly, the packet output from the layer 2 switch 11 is written as a valid packet into the packet buffer 13*a*. On the other hand, if the MAC address is not registered in the MAC management table 12*ab*, the packet is regarded as an invalid packet with an unknown destination and thus is not written into the packet buffer 13*a*.

The packet buffer 14*a* receives uplink packets output from a PON control section 15*aa* of the PON interface 15*a* and outputs the packets to the layer 2 switch 11 as well as to the terminal registration section 12*aa*.

The PON interface 15*a* includes the PON control section 15*aa* and an optical-electrical conversion section 15*ab*.

The PON control section 15*aa* outputs the packets received from the packet buffer 13*a* to the optical-electrical conversion section 15*ab*. Also, the PON control section 15*aa* accesses the multiple sub-units connected to the coupler by a time-division access technique to receive packets therefrom, and outputs the received packets to the packet buffer 14*a*. The terminal registration section 12*aa* mentioned above can identify a sub-unit which the PON control section 15*aa* is currently accessing, whereby the MAC addresses of terminals can be grouped by sub-unit when stored in the MAC management table 12*ab*.

The optical-electrical conversion section 15*ab* converts the packets output from the PON control section 15*aa* in the form of electrical signal into an optical signal and outputs the resulting signal to the coupler 21*a*. Also, the optical-electrical conversion section 15*ab* converts packets output from the sub-units in the form of optical signal into an electrical signal and outputs the resulting signal to the PON control section 15*aa*.

The circuit configuration of the sub-unit 22*a* will be now described. Since the sub-units 22*a*, 22*b*, . . . , 22*l*, . . . and the sub-units 23*a*, 23*b*, . . . , 23*n* have the same circuit configuration, the circuit configuration of the sub-unit 22*a* alone will be explained.

Figure 6:
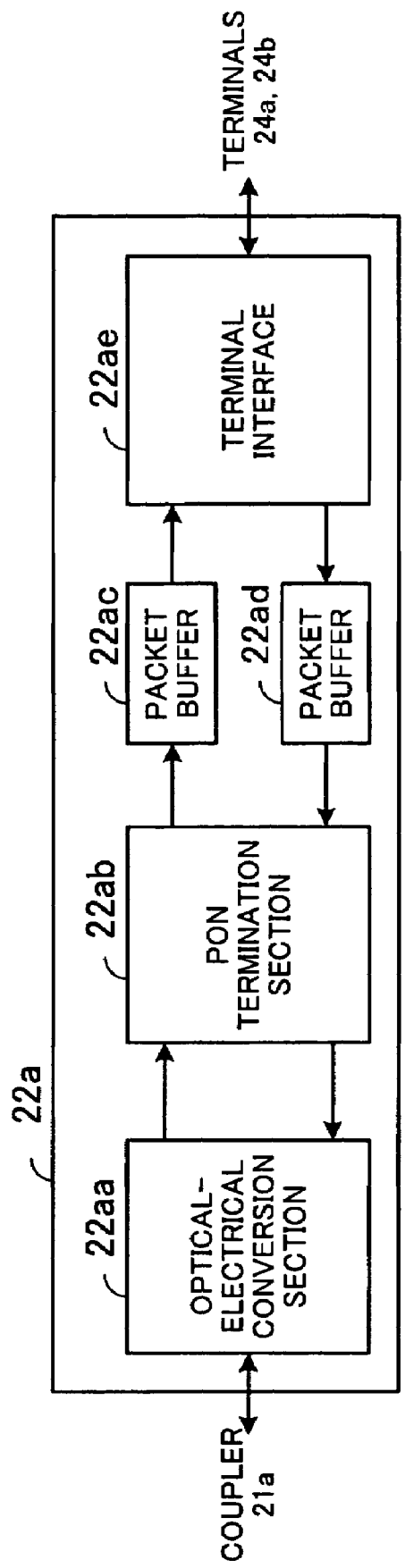
FIG. 6 is a circuit block diagram of a sub-unit.

FIG. 6 is a circuit block diagram of the sub-unit.

As shown in FIG. 6, the sub-unit 22*a* includes an optical-electrical conversion section 22*aa*, a PON termination section 22*ab*, packet buffers 22*ac* and 22*ad*, and a terminal interface 22*ae*.

The optical-electrical conversion section 22*aa* converts packets transmitted from the host unit 10 (coupler 21*a*) in the form of optical signal into an electrical signal and outputs the resulting signal to the PON termination section 22*ab*. Also, the optical-electrical conversion section 22*aa* converts packets output from the PON termination section 22*ab* in the form of electrical signal into an optical signal and outputs the resulting signal to the host unit 10.

The PON termination section 22*ab* prevents signal reflection of packets communicated with the host unit 10. The packet buffer 22*ac* retains the packets output from the PON termination section 22*ab* and outputs the packets to the terminal interface 22*ae*. The packet buffer 22*ad* retains packets output from the terminal interface 22*ae* and outputs the packets to the PON termination section 22*ab*. The terminal interface 22*ae* controls the exchange of packets with the terminals 24*a* and 24*b*.

Operation of the host unit shown in FIG. 3 will be now described.

When supplied with packets from the uplink, the layer 2 switch 11 allocates and outputs the packets to the filter control sections 12*a*, 12*b*, . . . in accordance with the MAC addresses (destination addresses) included in the packets. It is assumed here that the received packet is to be transmitted to a terminal of a sub-unit connected to the coupler 21*a* and thus is output to the filter control section 12*a*.

The validity determination section 12*ac* of the filter control section 12*a* outputs the packet received from the layer 2 switch 11 to the packet buffer 13*a*. At this time, the validity determination section 12*ac* extracts the MAC address (destination address) included in the packet and determines whether or not the extracted MAC address is registered in the MAC management table 12*ab*.

The MAC management table 12*ab* stores the MAC addresses of terminals connected to the sub-units. Thus, the validity determination section 12*ac* looks up the MAC management table 12*ab* to determine whether or not the terminal for which the packet is destined is connected to its corresponding sub-unit. If the extracted MAC address is stored in the MAC management table 12*ab*, validity information indicating validity of the packet is output to the write control section 12*ad*. If the extracted MAC address is not stored in the MAC management table 12*ab*, invalidity information indicating invalidity of the packet is output to the write control section 12*ad*.

In accordance with the validity or invalidity information supplied from the validity determination section 12*ac*, the write control section 12*ad* controls the writing of the packet output from the validity determination section 12*ac* into the packet buffer 13*a*.

If a packet write instruction is received from the write control section 12*ad*, the packet buffer 13*a* retains the packet output from the validity determination section 12*ac* and outputs the packet to the PON interface 15*a*. If no packet write instruction is received from the write control section 12*ad*, the packet output from the validity determination section 12*ac* is not retained but is discarded.

In this manner, the MAC addresses of terminals connected to the sub-units are extracted from uplink packets and registered in the MAC management table 12*ab*. Then, it is determined whether or not the MAC addresses of downlink packets are registered in the MAC management table 12*ab*. If the MAC addresses are not registered in the MAC management table 12*ab*, such packets are regarded as invalid packets with unknown destinations and thus are discarded, and if the MAC addresses are registered in the MAC management table 12*ab*, the packets are regarded as valid packets and output to the corresponding sub-units. This minimizes delivery of invalid packets, making it possible to restrain lowering of the transmission efficiency for valid packets.

A second embodiment of the present invention will be now described.

In the second embodiment, the IP addresses of the terminals are used for filtering downlink packets.

Figure 7:
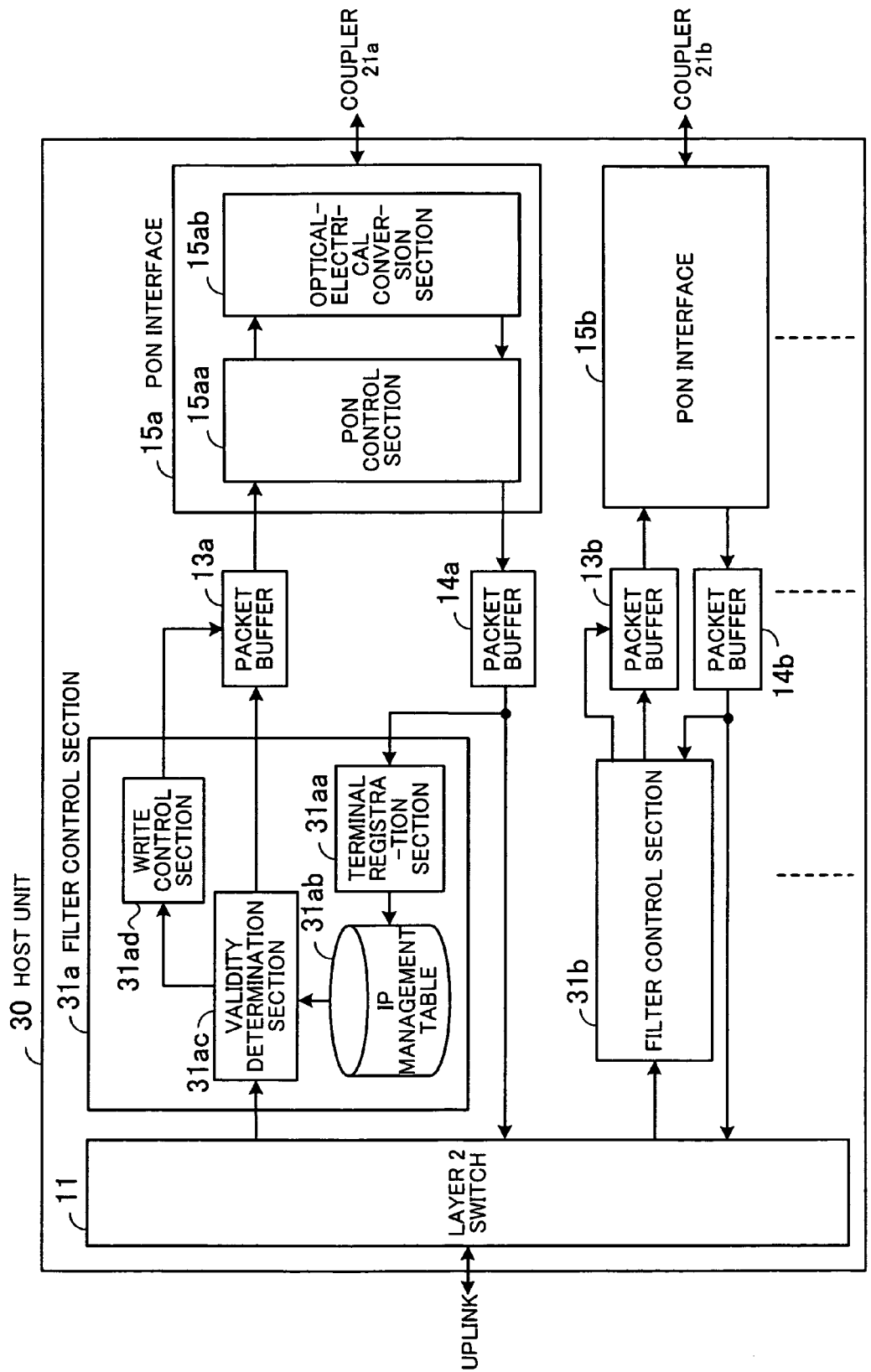
FIG. 7 is a circuit block diagram of a host unit according to a second embodiment.

FIG. 7 is a circuit block diagram of a host unit according to the second embodiment.

In the host unit 30 of FIG. 7, filter control sections 31*a*, 31*b*, . . . differ from the counterparts of the host unit 10 shown in FIG. 3. Accordingly, identical reference numerals are used in FIG. 7 to denote elements identical with those appearing in FIG. 3, and description of such elements is omitted. Also, the filter control sections 31*b*, . . . have the same construction as the filter control section 31*a*; therefore, in the following, only the filter control section 31*a* will be explained.

The filter control section 31*a* includes a terminal registration section 31*aa*, an IP management table 31*ab*, a validity determination section 31*ac*, and a write control section 31*ad*.

The terminal registration section 31*aa* extracts IP addresses of terminals connected to the sub-units, from uplink packets output from the packet buffer 14*a*, and stores the extracted addresses in the IP management table 31*ab*. At this time, the terminal registration section 31*aa* stores the extracted IP addresses of the terminals in the IP management table 31*ab* while grouping the addresses by sub-unit.

The IP management table 31*ab* is, for example, a table configured in a storage device such as a hard disk drive or RAM. An IP packet format and an exemplary structure of the IP management table 31*ab* will be described with reference to the drawings.

Figure 8:
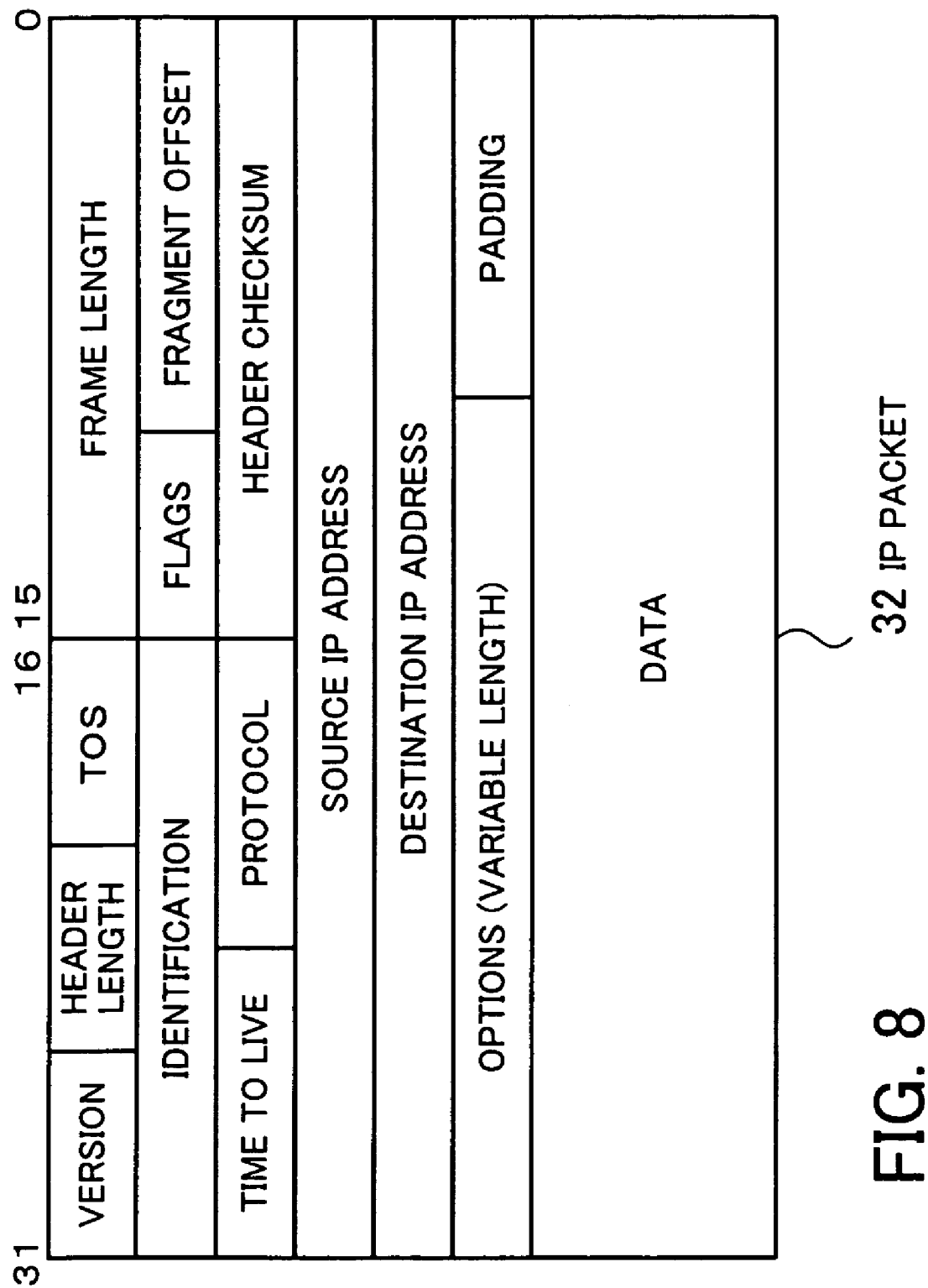
FIG. 8 is a diagram showing an IP packet format.

FIG. 8 shows an IP packet format.

As shown in FIG. 8, an IP packet 32 consists of VERSION, HEADER LENGTH, TOS, FRAME LENGTH, IDENTIFICATION, FLAGS, FRAGMENT OFFSET, TIME TO LIVE, PROTOCOL, HEADER CHECKSUM, SOURCE IP ADDRESS, DESTINATION IP ADDRESS, OPTIONS, PADDING, and DATA. The numbers appearing in FIG. 8 indicate the data width of the IP packet 32. In SOURCE IP ADDRESS is stored the IP address of a terminal which is the source of the packet, and in DESTINATION IP ADDRESS is stored the IP address of a terminal which is the destination of the packet.

FIG. 9 exemplifies the data structure of the IP management table.

As shown in FIG. 9, the IP management table 31*ab* has columns labeled "Sub-unit Name" and "IP Address". The sub-units are assigned respective identifiers whereby the individual sub-units can be identified. In the column "Sub-unit Name" are stored the identifiers of the sub-units connected to the host unit 30, and in the column "IP Address" are stored the IP addresses of the terminals connected to the respective sub-units.

In the example of FIG. 9, the identifiers of the sub-units connected to the host unit 30 are "Sub-unit #1", . . . , "Sub-unit #1". The IP addresses of the terminals connected to the sub-unit "Sub-unit #1" are "zzzz", "yyyy", . . . , "xxxx", and the IP addresses of the terminals connected to the sub-unit "Sub-unit #1" are "cccc", "bbbb", . . . , "aaaa".

Each uplink packet output from the packet buffer 14*a* includes the IP address of a terminal which is the source of the packet, as explained above with reference to FIG. 8. The IP address is extracted by the terminal registration section 31*aa*, grouped by sub-unit, and stored in the IP management table 31*ab*, as explained above with reference to FIG. 9. Consequently, the IP addresses of the terminals connected to the sub-units are stored in the IP management table 31*ab*.

The validity determination section 31*ac* receives downlink packets output from the layer 2 switch 11 and outputs the packets to the packet buffer 13*a*. Also, on receiving a packet from the layer 2 switch 11, the validity determination section 31*ac* extracts, from the packet, the IP address (destination IP address) of a terminal for which the packet is destined, and determines whether or not the extracted IP address is registered in the IP management table 31*ab*. If the IP address is registered in the IP management table 31*ab*, the validity determination section 31*ac* outputs validity information indicating validity of the packet to the write control section 31*ad*. If the IP address is not registered in the IP management table 31*ab*, the validity determination section 31*ac* outputs invalidity information indicating invalidity of the packet to the write control section 31*ad*.

In accordance with the validity information and invalidity information supplied from the validity determination section 31*ac*, the write control section 31*ad* controls the writing of packets output from the validity determination section 31*ac* into the packet buffer 13*a*.

Specifically, if the IP address (destination IP address) of a packet output from the layer 2 switch 11 is registered in the IP management table 31*ab*, it means that the terminal to which the packet is to be transmitted is connected to any of the sub-units. Accordingly, the packet output from the layer 2 switch 11 is written as a valid packet into the packet buffer 13*a*. On the other hand, if the IP address is not registered in the IP management table 31*ab*, the packet is regarded as an invalid packet with an unknown destination and thus is not written into the packet buffer 13*a*.

In this manner, the IP addresses of terminals connected to the sub-units are extracted from uplink packets and registered in the IP management table 31*ab*. Then, it is determined whether or not the IP addresses of downlink packets are registered in the IP management table 31*ab*. If the IP addresses are not registered in the IP management table 31*ab*, such packets are regarded as invalid packets with unknown destinations and thus are discarded, and if the IP addresses are registered in the IP management table 31*ab*, the packets are regarded as valid packets and output to the corresponding sub-units. Thus, even with respect to packets whose MAC address is broadcast address, like ARP (Address Resolution Protocol) packets, for example, invalid packets can be minimized by monitoring the IP addresses, making it possible to restrain lowering of the transmission efficiency for valid packets.

A third embodiment of the present invention will be now described.

The third embodiment differs from the first embodiment in that packets are filtered by making an additional determination as to whether or not a sub-unit is registered in the host unit.

Figure 10:
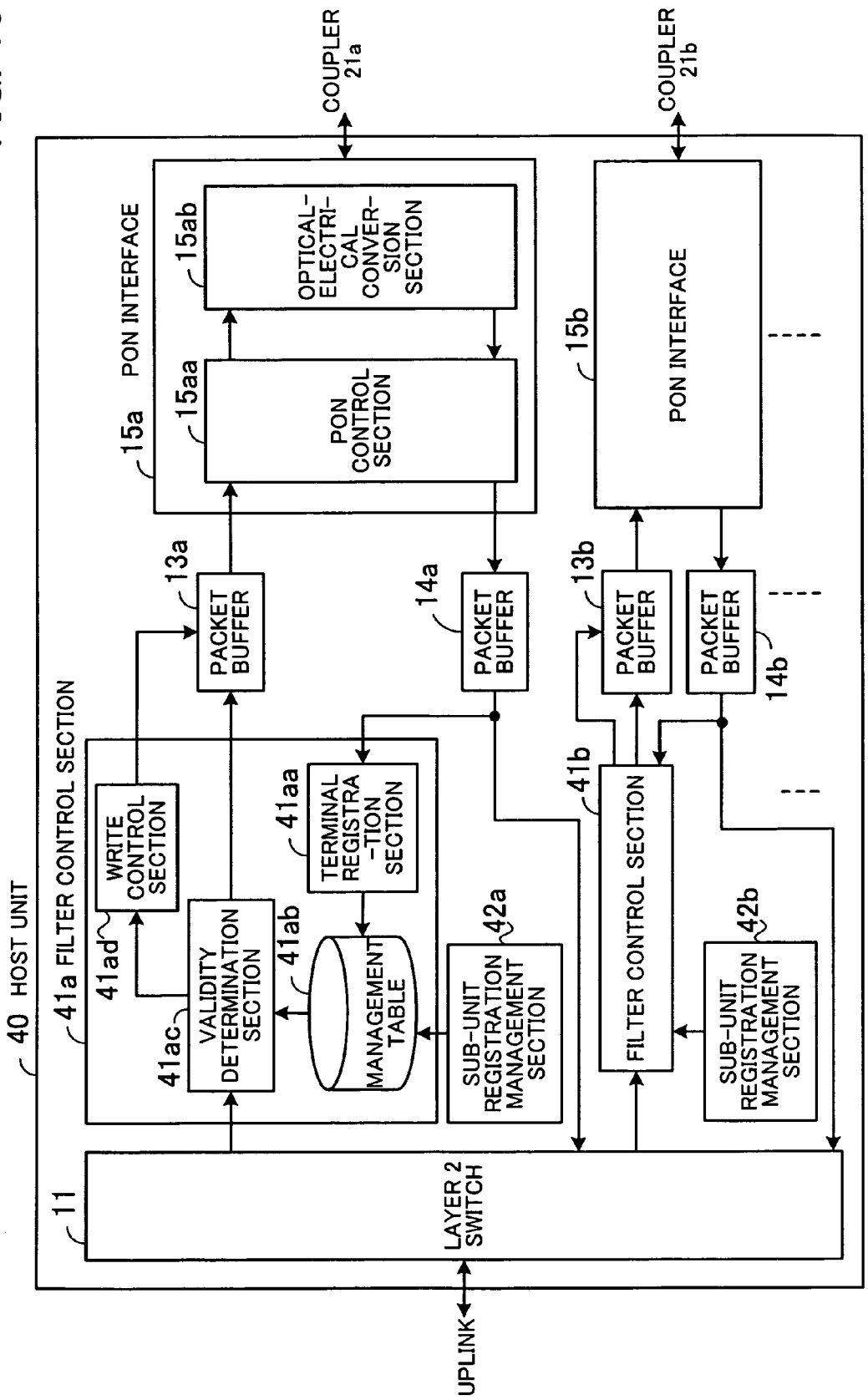
FIG. 10 is a circuit block diagram of a host unit according to a third embodiment.

FIG. 10 is a circuit block diagram of a host unit according to the third embodiment.

In the host unit 40 of FIG. 10, filter control sections 41*a*, 41*b*, . . . differ from the counterparts of the host unit 10 shown in FIG. 3. Also, the host unit 40 differs from the host unit 10 of FIG. 3 in that it includes sub-unit registration management sections 42*a*, 42*b*, . . . . Thus, identical reference numerals are used in FIG. 10 to denote elements identical with those appearing in FIG. 3, and description of such elements is omitted. Also, the filter control sections 41*b*, . . . have the same construction and function as the filter control section 41*a*, and the sub-unit registration management sections 42*b*, . . . have the same construction and function as the sub-unit registration management section 42*a*. In the following, therefore, only the filter control section 41*a* and the sub-unit registration management section 42*a* will be explained.

The filter control section 41*a* includes a terminal registration section 41*aa*, a management table 41*ab*, a validity determination section 41*ac*, and a write control section 41*ad*.

The terminal registration section 41*aa* extracts MAC addresses of terminals from uplink packets output from the packet buffer 14*a*, and stores the extracted addresses in the management table 41*ab*. At this time, the terminal registration section 41*aa* stores the extracted MAC addresses of the terminals in the management table 41*ab* while grouping the addresses by sub-unit.

The management table 41*ab* is, for example, a table configured in a storage device such as a hard disk drive or RAM. The management table 41*ab* includes a MAC management table identical with that shown in FIG. 5 and a table for storing sub-unit registration information. The sub-unit registration information is information indicating operational states of the individual sub-units.

The sub-unit registration management section 42a receives the sub-unit registration information indicating whether to operate the individual sub-units or not from, for example, the operator, and stores the information in the management table 41ab. In the case where the sub-unit registration information stored in the management table 41ab indicates that a certain sub-unit is not registered, then the host unit 40 does not communicate packets to the sub-unit even if the sub-unit is connected to the host unit 40 and is in a state ready for communication. An exemplary data structure of the management table 41ab will be described.

FIG. 11 exemplifies the data structure of the management table.

As shown in FIG. 11, the management table 41ab has columns labeled "Sub-unit Name" and "Sub-unit Registration Information". The sub-units are assigned respective identifiers whereby the individual sub-units can be identified. In the column "Sub-unit Name" are stored the identifiers of the sub-units connected to the host unit 40, and in the column "Sub-unit Registration Information" is stored registration information indicating whether to operate the individual sub-units.

In the example of FIG. 11, the identifiers of the sub-units connected to the host unit 40 are "Sub-unit #1", . . . , "Sub-unit #1". The sub-unit #1 is registered and can communicate with the host unit 40, but the sub-unit #2 is not registered and thus is unable to communicate with the host unit 40. Although not shown in FIG. 11, the management table 41ab includes a MAC management table identical with that shown in FIG. 5.

The validity determination section 41ac receives downlink packets output from the layer 2 switch 11 and outputs the packets to the packet buffer 13a. Also, on receiving a packet from the layer 2 switch 11, the validity determination section 41ac extracts, from the packet, the MAC address (destination address) of a terminal for which the packet is destined. Then, the validity determination section 41ac looks up the sub-unit registration information in the management table 41ab to determine whether the sub-unit with which the terminal with the extracted MAC address is associated is registered or not. The sub-unit with which the terminal with the extracted MAC address is associated can be identified by looking up the MAC management table included in the management table 41ab.

If the sub-unit is not registered, the validity determination section 41ac outputs invalidity information indicating invalidity of the packet to the write control section 41ad. On the other hand, if the sub-unit is registered, the validity determination section 41ac looks up the MAC management table included in the management table 41ab to determine whether or not the terminal with the extracted MAC address is connected to the sub-unit. If the terminal is connected to the sub-unit, the validity determination section 41ac outputs validity information indicating validity of the packet to the write control section 41ad. If the terminal is not connected to the sub-unit, the validity determination section 41ac outputs invalidity information indicating invalidity of the packet to the write control section 41ad.

In accordance with the validity information and invalidity information supplied from the validity determination section 41ac, the write control section 41ad controls the writing of packets output from the validity determination section 41ac into the packet buffer 13a.

In this manner, using the destination address of a packet output from the layer 2 switch 11, the management table 41ab is looked up to determine whether or not the corresponding sub-unit is registered. If the sub-unit is not registered, the packet output from the layer 2 switch 11 is discarded as an unnecessary packet. This minimizes delivery of unnecessary packets, making it possible to restrain lowering of the transmission efficiency for valid packets.

In the above embodiment, determination as to registration of a sub-unit and then determination as to connection of a terminal to the sub-unit are successively made. Alternatively, registration of sub-units alone may be determined before unnecessary packets are discarded. In this case, the terminal registration section 41aa is unnecessary and the validity determination section 41ac determines only the status of registration of the sub-units.

Also, in the above embodiment, packets are filtered by using MAC addresses but may alternatively be filtered by using IP addresses in the same manner as explained above with reference to the second embodiment.

A fourth embodiment of the present invention will be now described.

The fourth embodiment differs from the first embodiment in that packets are filtered by making an additional determination as to whether or not a sub-unit is in a normal state or anomalous state.

Figure 12:
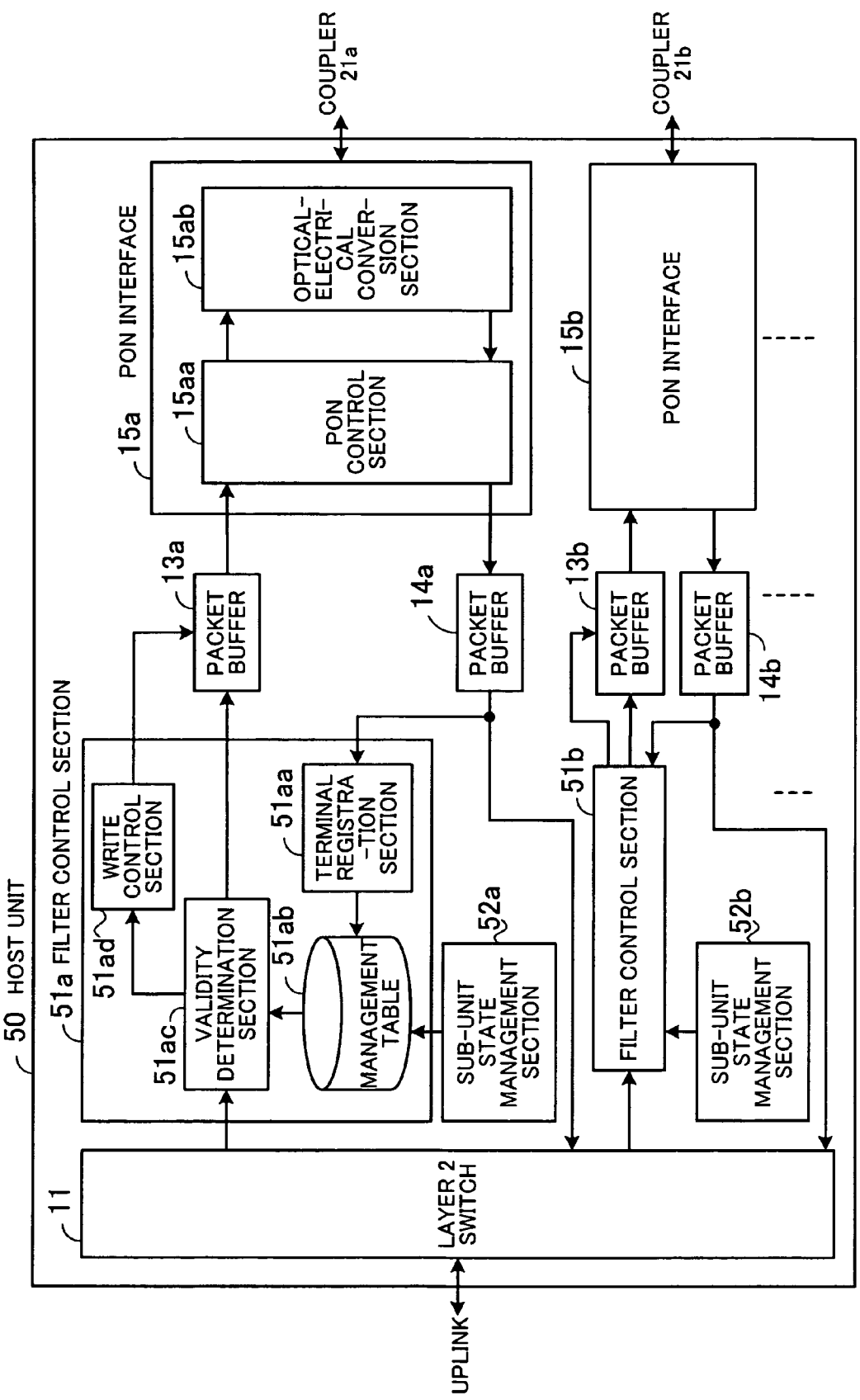
FIG. 12 is a circuit block diagram of a host unit according to a fourth embodiment.

FIG. 12 is a circuit block diagram of a host unit according to the fourth embodiment.

In the host unit 50 of FIG. 12, filter control sections 51a, 51b, . . . differ from the counterparts of the host unit 10 shown in FIG. 3. Also, the host unit 50 differs from the host unit 10 of FIG. 3 in that it includes sub-unit state management sections 52a, 52b, . . . . Thus, identical reference numerals are used in FIG. 12 to denote elements identical with those appearing in FIG. 3, and description of such elements is omitted. Also, the filter control sections 51b, . . . have the same construction and function as the filter control section 51a, and the sub-unit state management sections 52b, . . . have the same construction and function as the sub-unit state management section 52a. In the following, therefore, only the filter control section 51a and the sub-unit state management section 52a will be explained.

The filter control section 51a includes a terminal registration section 51aa, a management table 51ab, a validity determination section 51ac, and a write control section 51ad.

The terminal registration section 51aa extracts MAC addresses of terminals from uplink packets output from the packet buffer 14a, and stores the extracted addresses in the management table 51ab. At this time, the terminal registration section 51aa stores the extracted MAC addresses of the terminals in the management table 51ab while grouping the addresses by sub-unit.

The management table 51ab is, for example, a table configured in a storage device such as a hard disk drive or RAM. The management table 51ab includes a MAC management table identical with that shown in FIG. 5 and a table for storing sub-unit state information. The sub-unit state information is information indicating normal or anomalous states of the individual sub-units.

The sub-unit state management section 52a monitors the sub-units to detect anomalies such as interruption of power supply or faults, and stores the monitored states in the management table 51ab. Anomaly of a sub-unit such as interruption of power supply or fault may be detected by ascertaining that the sub-unit, even though accessed, fails to return a packet. An exemplary data structure of the management table 51ab will be described.

FIG. 13 exemplifies the data structure of the management table.

As shown in FIG. 13, the management table 51ab has columns labeled "Sub-unit Name" and "Sub-unit State Information". The sub-units are assigned respective identifiers whereby the individual sub-units can be identified. In the column "Sub-unit Name" are stored the identifiers of the sub-units connected to the host unit 50, and in the column "Sub-unit State Information" is stored sub-unit state information indicating whether the individual sub-units are normal or anomalous.

In the example of FIG. 13, the identifiers of the sub-units connected to the host unit 50 are "Sub-unit #1", . . . , "Sub-unit #1". The sub-unit #1 is in a normal state. On the other hand, the sub-unit #3 is in an anomalous state; for example, the power supply thereto is interrupted or fault has occurred. Although not shown in FIG. 13, the management table 51ab includes a MAC management table identical with that shown in FIG. 5.

The validity determination section 51ac receives downlink packets output from the layer 2 switch 11 and outputs the packets to the packet buffer 13a. Also, on receiving a packet from the layer 2 switch 11, the validity determination section 51ac extracts, from the packet, the MAC address (destination address) of a terminal for which the packet is destined. Then, the validity determination section 51ac looks up the sub-unit state information in the management table 51ab to determine whether the sub-unit with which the terminal with the extracted MAC address is associated is normal or anomalous. The sub-unit with which the terminal with the extracted MAC address is associated can be identified by looking up the MAC management table included in the management table 51ab.

If the sub-unit is anomalous, the validity determination section 51ac outputs invalidity information indicating invalidity of the packet to the write control section 51ad. On the other hand, if the sub-unit is normal, the validity determination section 51ac looks up the MAC management table included in the management table 51ab to determine whether or not the terminal with the extracted MAC address is connected to the sub-unit. If the terminal is connected to the sub-unit, the validity determination section 51ac outputs validity information indicating validity of the packet to the write control section 51ad. If the terminal is not connected to the sub-unit, the validity determination section 51ac outputs invalidity information indicating invalidity of the packet to the write control section 51ad.

In accordance with the validity information and invalidity information supplied from the validity determination section 51ac, the write control section 51ad controls the writing of packets output from the validity determination section 51ac into the packet buffer 13a.

In this manner, using the destination address of a packet output from the layer 2 switch 11, the management table 51ab is looked up to determine whether the corresponding sub-unit is normal or anomalous. If the sub-unit is anomalous, the packet output from the layer 2 switch 11 is discarded on the assumption that the packet cannot be communicated to the sub-unit. This minimizes delivery of unnecessary packets, making it possible to restrain lowering of the transmission efficiency for valid packets.

In the above embodiment, determination as to normalcy/anomaly of a sub-unit and then determination as to connection of a terminal to the sub-unit are successively made. Alternatively, normalcy/anomaly of sub-units only may be determined before unnecessary packets are discarded. In this case, the terminal registration section 51aa is unnecessary and the validity determination section 51ac determines only the normalcy/anomaly of the sub-units.

Also, in the above embodiment, packets are filtered by using MAC addresses but may alternatively be filtered by using IP addresses in the same manner as explained above with reference to the second embodiment.

A fifth embodiment of the present invention will be now described.

The fifth embodiment differs from the first embodiment in that packets are filtered by making an additional determination as to whether or not a link is established between a sub-unit and the host unit.

Figure 14:
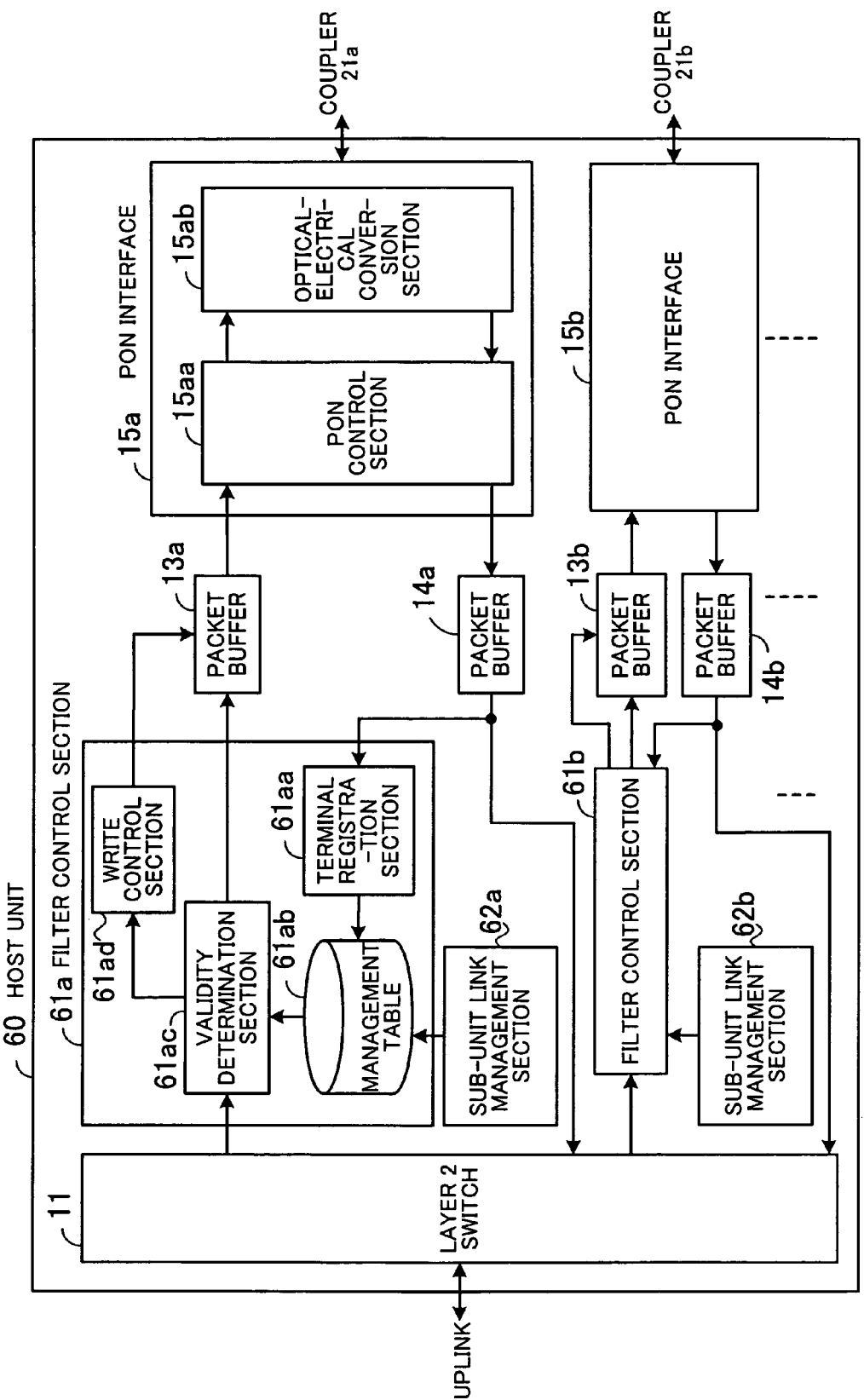
FIG. 14 is a circuit block diagram of a host unit according to a fifth embodiment.

FIG. 14 is a circuit block diagram of a host unit according to the fifth embodiment.

In the host unit 60 of FIG. 14, filter control sections 61a, 61b, . . . differ from the counterparts of the host unit 10 shown in FIG. 3. Also, the host unit 60 differs from the host unit 10 of FIG. 3 in that it includes sub-unit link management sections 62a, 62b, . . . . Thus, identical reference numerals are used in FIG. 14 to denote elements identical with those appearing in FIG. 3, and description of such elements is omitted. Also, the filter control sections 61b, . . . have the same construction and function as the filter control section 61a, and the sub-unit link management sections 62b, . . . have the same construction and function as the sub-unit link management section 62a. In the following, therefore, only the filter control section 61a and the sub-unit link management section 62a will be explained.

The filter control section 61a includes a terminal registration section 61aa, a management table 61ab, a validity determination section 61ac, and a write control section 61ad.

The terminal registration section 61aa extracts MAC addresses of terminals from uplink packets output from the packet buffer 14a, and stores the extracted addresses in the management table 61ab. At this time, the terminal registration section 61aa stores the extracted MAC addresses of the terminals in the management table 61ab while grouping the addresses by sub-unit.

The management table 61ab is, for example, a table configured in a storage device such as a hard disk drive or RAM. The management table 61ab includes a MAC management table identical with that shown in FIG. 5 and a table for storing link information. The link information is information indicating whether or not the individual sub-units have established a link with the host unit 60 for communication therewith.

The sub-unit link management section 62a extracts link information included in PON data transmitted from the sub-units and stores the link information in the management table 61ab. The following describes an exemplary data structure of the PON data transmitted from the individual sub-units and an exemplary data structure of the management table 61ab.

Figure 15:
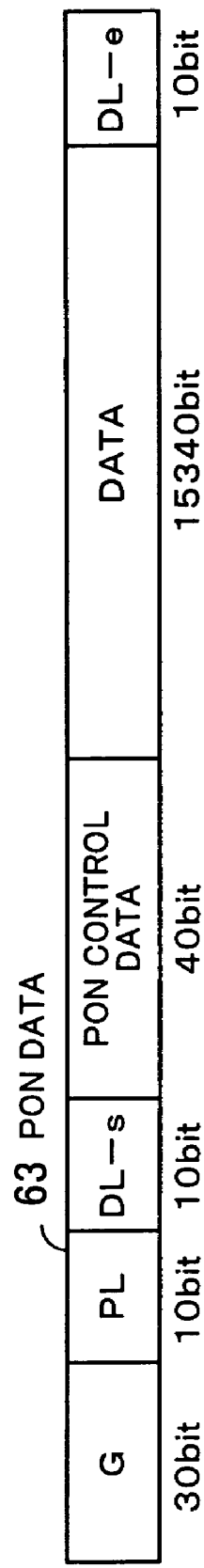
FIG. 15 is a diagram showing an exemplary data structure of PON data.

FIG. 15 exemplifies the data structure of the PON data.

As shown in FIG. 15, PON data 63 consists of 30-bit GUARD TIME (G), 10-bit PREAMBLE (PL), 10-bit STARTING DELIMITER (DL-s), 40-bit PON CONTROL DATA, 15,340-bit DATA (DATA), and 10-bit ENDING DELIMITER (DL-e). The link information indicating whether a link with the host unit 60 is established or not is contained in 40-bit PON CONTROL DATA.

FIG. 16 exemplifies the data structure of the management table.

As shown in FIG. 16, the management table 61ab has columns labeled "Sub-unit Name" and "Link Information". The sub-units are assigned respective identifiers whereby the individual sub-units can be identified. In the column "Sub-unit Name" are stored the identifiers of the sub-units connected to the host unit 60, and in the column "Link Information" is stored link information indicating whether or not the individual sub-units have established a link with the host unit 60.

In the example of FIG. 16, the identifiers of the sub-units connected to the host unit 60 are "Sub-unit #1", ..., "Sub-unit #1". A link is established between the sub-unit #1 and the host unit 60, but no link is established between the sub-unit #2 and the host unit 60. Although not shown in FIG. 16, the management table 61ab includes a MAC management table identical with that shown in FIG. 5.

The validity determination section 61ac receives downlink packets output from the layer 2 switch 11 and outputs the packets to the packet buffer 13a. Also, on receiving a packet from the layer 2 switch 11, the validity determination section 61ac extracts, from the packet, the MAC address (destination address) of a terminal for which the packet is destined. Then, the validity determination section 61ac looks up the link information in the management table 61ab to determine whether or not the sub-unit with which the terminal with the extracted MAC address is associated has established a link with the host unit. The sub-unit with which the terminal with the extracted MAC address is associated can be identified by looking up the MAC management table included in the management table 61ab.

If no link is established between the sub-unit and the host unit, the validity determination section 61ac outputs invalidity information indicating invalidity of the packet to the write control section 61ad. On the other hand, if a link is established between the sub-unit and the host unit, the validity determination section 61ac looks up the MAC management table included in the management table 61ab to determine whether or not the terminal with the extracted MAC address is connected to the sub-unit. If the terminal is connected to the sub-unit, the validity determination section 61ac outputs validity information indicating validity of the packet to the write control section 61ad. If the terminal is not connected to the sub-unit, the validity determination section 61ac outputs invalidity information indicating invalidity of the packet to the write control section 61ad.

In accordance with the validity information and invalidity information supplied from the validity determination section 61ac, the write control section 61ad controls the writing of packets output from the validity determination section 61ac into the packet buffer 13a.

In this manner, using the destination address of a packet output from the layer 2 switch 11, the management table 61ab is looked up to determine whether or not a link is established between the corresponding sub-unit and the host unit 60. If no link is established between the sub-unit and the host unit, the packet output from the layer 2 switch 11 is discarded since the packet cannot be communicated to the sub-unit. This minimizes delivery of unnecessary packets, making it possible to restrain lowering of the transmission efficiency for valid packets.

In the above embodiment, determination as to link establishment of a sub-unit and then determination as to connection of a terminal to the sub-unit are successively made. Alternatively, link establishment of sub-units alone may be determined before unnecessary packets are discarded. In this case, the terminal registration section 61aa is unnecessary and the validity determination section 61ac determines only the link establishment of the sub-units.

Also, in the above embodiment, packets are filtered by using MAC addresses but may alternatively be filtered by using IP addresses in the same manner as explained above with reference to the second embodiment.

A sixth embodiment of the present invention will be now described.

The sixth embodiment differs from the first embodiment in that packets are filtered by making an additional determination as to whether or not the flow rate of packets being output to a sub-unit is higher than the line speed of the sub-unit.

Figure 17:
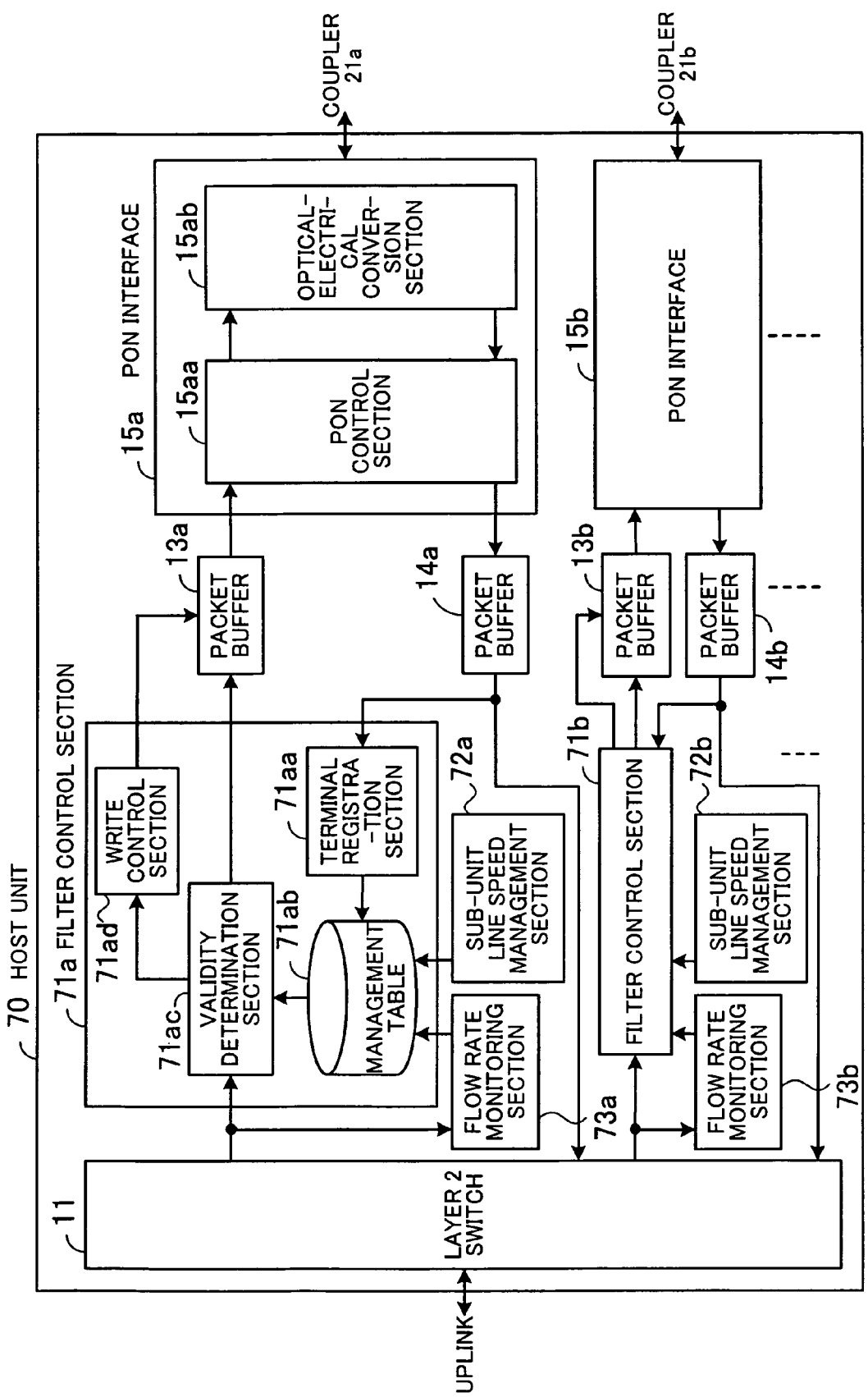
FIG. 17 is a circuit block diagram of a host unit according to a sixth embodiment.
Figure 19:
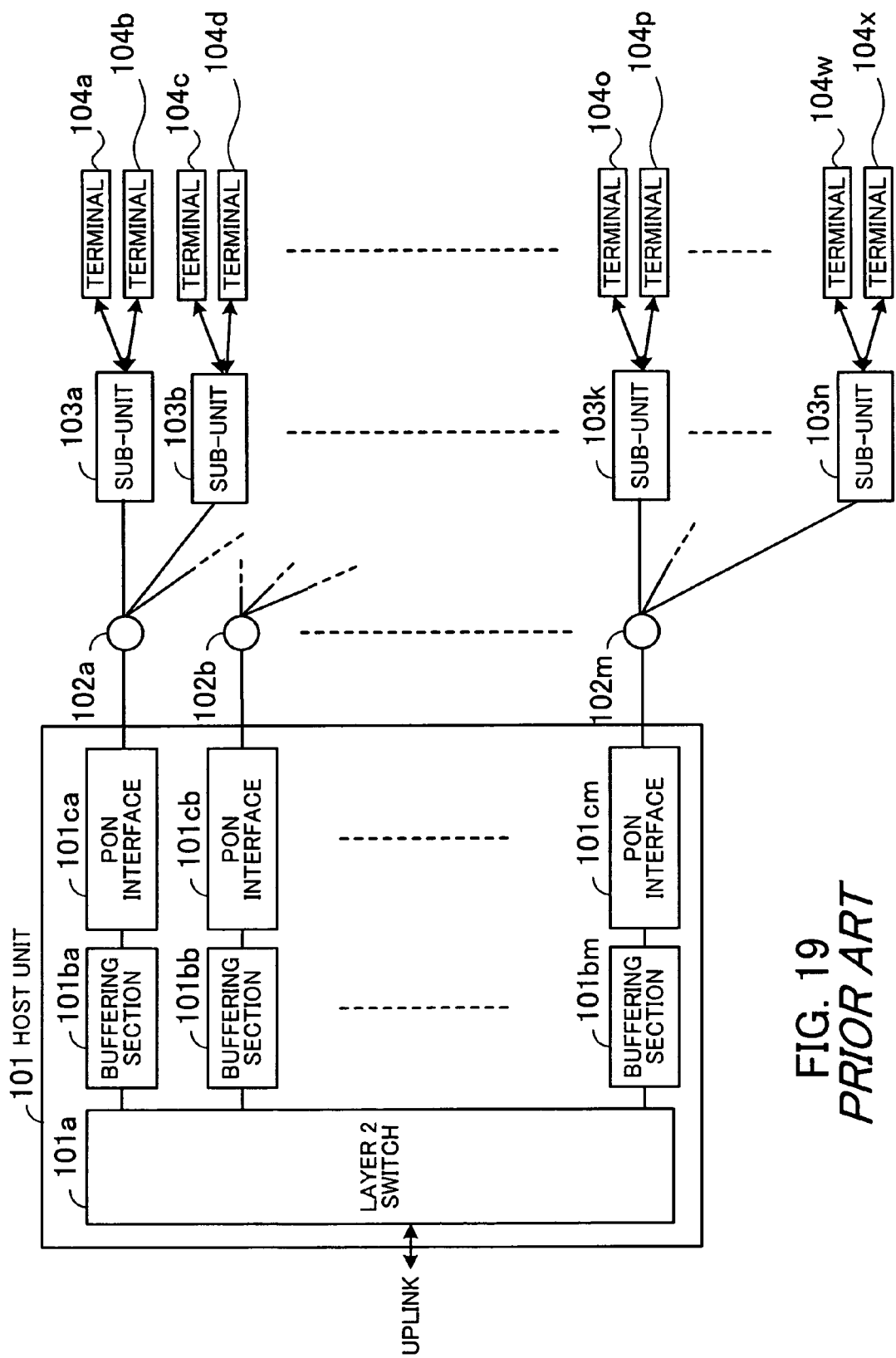
FIG. 19 is a diagram showing a PON system configuration.

FIG. 17 is a circuit block diagram of a host unit according to the sixth embodiment.

In the host unit 70 of FIG. 17, filter control sections 71a, 71b, ... differ from the counterparts of the host unit 10 shown in FIG. 3. Also, the host unit 70 differs from the host unit 10 of FIG. 3 in that it includes sub-unit line speed management sections 72a, 72b, ... and flow rate monitoring sections 73a, 73b, .... Thus, identical reference numerals are used in FIG. 17 to denote elements identical with those appearing in FIG. 3, and description of such elements is omitted. Also, the filter control sections 71b, ... have the same construction and function as the filter control section 71a, the sub-unit line speed management sections 72b, ... have the same construction and function as the sub-unit line speed management section 72a, and the flow rate monitoring sections 73b, ... have the same construction and function as the flow rate monitoring section 73a. In the following, therefore, only the filter control section 71a, the sub-unit line speed management section 72a and the flow rate monitoring section 73a will be explained.

The filter control section 71a includes a terminal registration section 71aa, a management table 71ab, a validity determination section 71ac, and a write control section 71ad.

The terminal registration section 71aa extracts MAC addresses of terminals from uplink packets output from the packet buffer 14a, and stores the extracted addresses in the management table 71ab. At this time, the terminal registration section 71aa stores the extracted MAC addresses of the terminals in the management table 71ab while grouping the addresses by sub-unit.

The management table 71ab is, for example, a table configured in a storage device such as a hard disk drive or RAM. The management table 71ab includes a MAC management table identical with that shown in FIG. 5 and a table for storing the line speeds of the individual sub-units and the flow rates of packets being output to the respective sub-units.

The sub-unit line speed management section 72a extracts sub-unit line speeds included in the PON data 63 of FIG. 15, transmitted from the individual sub-units, and stores the extracted line speeds in the management table 71ab. The line speed is included in PON CONTROL DATA of the PON data 63.

The flow rate monitoring section 73a monitors the flow rate of packets output from the layer 2 switch 11 and stores the flow rate being monitored in the management table 71ab. An exemplary data structure of the management table 71ab will be explained.

FIG. 18 exemplifies the data structure of the management table.

As shown in FIG. 18, the management table 71ab has columns labeled "Sub-unit Name", "Line Speed" and "Flow Rate". The sub-units are assigned respective identifiers whereby the individual sub-units can be identified. In the column "Sub-unit Name", the identifiers of the sub-units connected to the host unit 70 are stored. In the column "Line Speed" are stored line speeds at which the respective sub-units can communicate with the host unit 70, and in the column "Flow Rate" are stored flow rates at which packets are being output from the layer 2 switch 11.

In the example of FIG. 18, the identifiers of the sub-units connected to the host unit 70 are "Sub-unit #1", ..., "Sub-unit

1". The line speed of the sub-unit #1 is 10 M, and the line speed of the sub-unit #2 is 100 M. The flow rate of packets being output to the sub-unit #1 is 8 M, and the flow rate of packets being output to the sub-unit #2 is 20 M. Although not illustrated in FIG. 18, the management table 71*ab* includes a MAC management table identical with that shown in FIG. 5.

The validity determination section 71*ac* receives downlink packets output from the layer 2 switch 11 and outputs the packets to the packet buffer 13*a*. Also, on receiving a packet from the layer 2 switch 11, the validity determination section 71*ac* extracts, from the packet, the MAC address (destination address) of a terminal for which the packet is destined. Then, the validity determination section 71*ac* looks up the line speed and flow rate in the management table 71*ab* and makes a comparison between the line speed and flow rate of the sub-unit with which the terminal with the extracted MAC address is associated. The sub-unit with which the terminal with the extracted MAC address is associated can be identified by looking up the MAC management table included in the management table 71*ab*.

If the flow rate is higher than the line speed, the validity determination section 71*ac* outputs invalidity information indicating invalidity of the packet to the write control section 71*ad*. On the other hand, if the flow rate does not exceed the line speed, the validity determination section 71*ac* looks up the MAC management table included in the management table 71*ab* to determine whether or not the terminal with the address for which the packet is destined is connected to the sub-unit. If the terminal is connected to the sub-unit, the validity determination section 71*ac* outputs validity information indicating validity of the packet to the write control section 71*ad*. If the terminal is not connected to the sub-unit, the validity determination section 71*ac* outputs invalidity information indicating invalidity of the packet to the write control section 71*ad*.

In accordance with the validity information and invalidity information supplied from the validity determination section 71*ac*, the write control section 71*ad* controls the writing of packets output from the validity determination section 71*ac* into the packet buffer 13*a*.

In this manner, using the destination address of a packet output from the layer 2 switch 11, the management table 71*ab* is looked up to determine whether or not the flow rate is higher than the line speed of the corresponding sub-unit. If the line speed of the sub-unit is exceeded by the flow rate, the packet output from the layer 2 switch 11 is discarded as an unnecessary packet. This minimizes delivery of unnecessary packets, making it possible to restrain lowering of the transmission efficiency for valid packets.

In the above embodiment, the flow rate of a sub-unit and then the connection of a terminal to the sub-unit are successively determined. Alternatively, only the flow rates of the sub-units may be determined before discarding unnecessary packets. In this case, the terminal registration section 71*aa* is unnecessary and the validity determination section 71*ac* determines only the flow rates of the sub-units.

Also, in the above embodiment, packets are filtered by using MAC addresses but may alternatively be filtered by using IP addresses in the same manner as explained above with reference to the second embodiment.

In the communication device of the present invention, if a terminal for which a packet is destined is not connected to its corresponding sub-unit, the packet is not output to a coupler to which the sub-unit is connected. This prevents packets with unknown destinations from being output to sub-units, making it possible to restrain lowering of the transmission efficiency for valid packets.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A host unit connected with a plurality of couplers on a downlink side thereof in a passive optical network, each of the couplers being connected with a plurality of sub-units, said host unit comprising:
   a layer 2 switch to switch a path for outputting packets to the couplers, at layer 2 in an OSI reference model;
   a terminal registration section to extract addresses of terminals connected to the sub-units from uplink packets, and to control storing of the extracted addresses in an address management table;
   a validity determining section to extract an address of a destination terminal included in a downlink packet output from said layer 2 switch and to determine whether or not an address identical with the extracted address of the destination terminal is stored in the address management table; and
   a write control section to broadcast the downlink packet to the passive network if the validity determining section determines that the extracted address of the destination terminal is among the addresses of terminals which are stored in the address management table and discard the downlink packet without broadcasting the downlink packet to the passive optical network if the validity determining section determines that the extracted address of the destination terminal is not among the addresses of terminals which are stored in the address management table.

2. The host unit according to claim 1, further comprising:
   a sub-unit registration table to store registration information indicating whether the individual sub-units are registered or not, and
   wherein said validity determining section determines, in accordance with the registration information, the sub-unit to which the destination terminal is connected.

3. The host unit according to claim 1, further comprising:
   a state management table to store state information indicating whether the individual sub-units are normal or not, and
   wherein said validity determining section determines, in accordance with the state information, the sub-unit to which the destination terminal is connected.

4. The host unit according to claim 1, further comprising:
   a link information management table to store link information indicating whether a link with the individual sub-units is established or not, and
   wherein said validity determining section determines, in accordance with the link information, the sub-unit to which the destination terminal is connected.

5. The host unit according to claim 1, further comprising:
   a flow rate management table to store flow rates of downlink packets, and
   wherein said validity determining section determines, in accordance with the flow rate, the sub-unit to which the destination terminal is connected.

6. The host unit according to claim 1, wherein said address is a MAC address.

7. The host unit according to claim 1, wherein said address is an IP address.

8. A communication method for a host unit connected with a plurality of couplers on a downlink side thereof in a passive optical network, each of the couplers being connected with a plurality of sub-units, said communication method comprising:

extracting an address of a destination terminal included in a downlink packet whose output path, with respect to the couplers, has been switched at layer 2 in an OSI reference model;

determining whether or not an address identical with the extracted address is stored in an address management table for storing addresses of terminals extracted from uplink packets;

outputting the downlink packet to the passive optical network in accordance with a result of the determining; and broadcasting the downlink packet to the passive network if it is determined that the extracted address of the destination terminal is among the addresses of terminals which are stored in the address management table, while discarding the downlink packet without broadcasting the downlink packet to the passive optical network if it is determined that the address is not among the addresses of terminals which are stored in the address management table.

9. The method according to claim 8, further comprising:
 storing registration information indicating whether the individual sub-units are registered or not, and
 wherein said determining section determines, in accordance with the registration information, the sub-unit to which the destination terminal is connected.

10. The method according to claim 8, further comprising:
 storing state information indicating whether the individual sub-units are normal or not, and
 wherein said determining determines, in accordance with the state information, the sub-unit to which the destination terminal is connected.

11. The method according to claim 8, further comprising:
 storing link information indicating whether a link with the individual sub-units is established or not, and
 wherein said determining determines, in accordance with the link information, the sub-unit to which the destination terminal is connected.

12. The method according to claim 8, further comprising:
 storing flow rates of downlink packets, and
 wherein said determining determines, in accordance with the flow rate, the sub-unit to which the destination terminal is connected.

13. The method according to claim 8, wherein said address is a MAC address.

14. The method according to claim 8, wherein said address is an IP address.

\* \* \* \* \*